US012608123B2

(12) United States Patent　　　　(10) Patent No.:　US 12,608,123 B2
Kasai　　　　　　　　　　　　　　　(45) Date of Patent:　　　Apr. 21, 2026

(54) VIDEO PROCESSING APPARATUS, COMPUTER-READABLE RECORDING MEDIUM RECORDING VIDEO PROCESSING PROGRAM, AND VIDEO PROCESSING METHOD

(71) Applicant: Roland Corporation, Shizuoka (JP)

(72) Inventor: Yoshihide Kasai, Shizuoka (JP)

(73) Assignee: Roland Corporation, Shizuoka (JP)

( * ) Notice: Subject to any disclaimer, the term of this patent is extended or adjusted under 35 U.S.C. 154(b) by 304 days.

(21) Appl. No.: 18/429,348

(22) Filed: Jan. 31, 2024

(65) Prior Publication Data

US 2024/0283888 A1　　Aug. 22, 2024

(30) Foreign Application Priority Data

Feb. 22, 2023　(JP) ................................. 2023-026294

(51) Int. Cl.
　　*G06T 7/33*　　　　　(2017.01)
　　*G06F 3/04845*　　　(2022.01)
　　*G06F 3/0486*　　　　(2013.01)
(52) U.S. Cl.
　　CPC ........ *G06F 3/0486* (2013.01); *G06F 3/04845* (2013.01); *G06T 7/33* (2017.01); *G06T 2200/24* (2013.01); *G06T 2207/10016* (2013.01); *G06T 2207/20092* (2013.01); *G06T 2207/20212* (2013.01)
(58) Field of Classification Search
　　CPC ..... G06F 3/0486; G06F 3/04845; G06T 7/33; G06T 2200/24; G06T 2207/10016; G06T 2207/20092; G06T 2207/20212
　　See application file for complete search history.

(56) References Cited

U.S. PATENT DOCUMENTS

| | | | |
|---|---|---|---|
| 8,416,237 B1 * | 4/2013 | Jain ......................... | G06T 19/00 |
| | | | 345/420 |
| 2002/0118302 A1 * | 8/2002 | Iizuka ..................... | H04N 9/74 |
| | | | 348/584 |
| 2008/0225153 A1 * | 9/2008 | Fagans ..................... | G06F 3/14 |
| | | | 348/E5.022 |
| 2013/0222313 A1 * | 8/2013 | Nakamura .......... | G06F 3/04883 |
| | | | 345/173 |
| 2024/0135660 A1 * | 4/2024 | Nakamura ................ | G06T 3/40 |

FOREIGN PATENT DOCUMENTS

JP　　　　2002262179　　　9/2002

* cited by examiner

*Primary Examiner* — Rinna Yi
(74) *Attorney, Agent, or Firm* — JCIPRNET

(57)　　　　ABSTRACT

Provided are a video processing apparatus that is capable of easily aligning sides near a specified position among the sides of contents arranged in a composite video, a computer-readable recording medium recording a video processing program, and a video processing method. In a video switcher 1, a specified position specified in a composite video Sc by a user H via touch panels 3*a* and 4*a* is acquired, and a search range Se is formed based on the specified position. The sides of contents C1 to C3 included in the search range Se are identified as specific sides Ss, and the identified specific sides Ss are aligned. Thus, the user H is allowed to easily align the sides near the specified position, among the sides of the contents C1 to C3 arranged in the composite video Sc, by simply specifying the specified position in the composite video Sc.

18 Claims, 9 Drawing Sheets

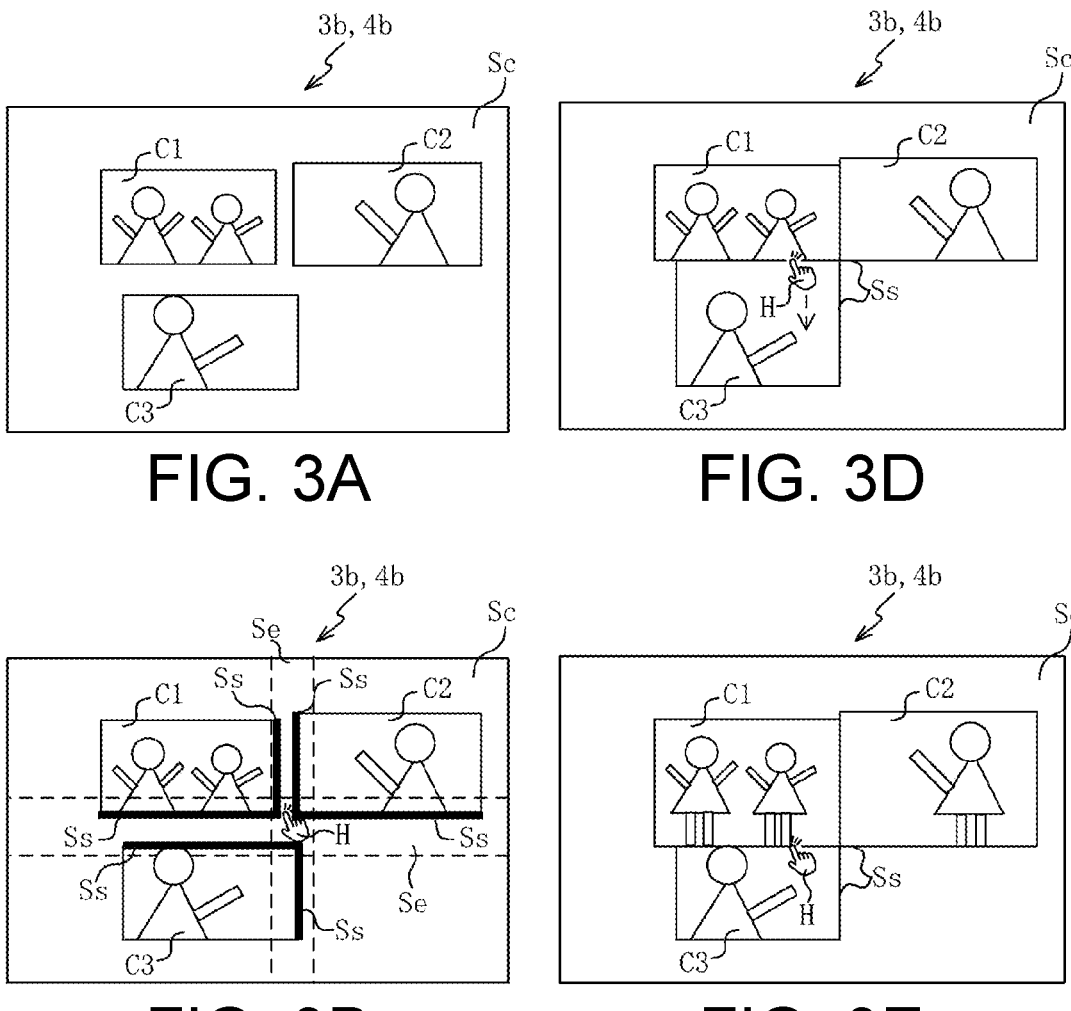
FIG. 3A            FIG. 3D
FIG. 3B            FIG. 3E
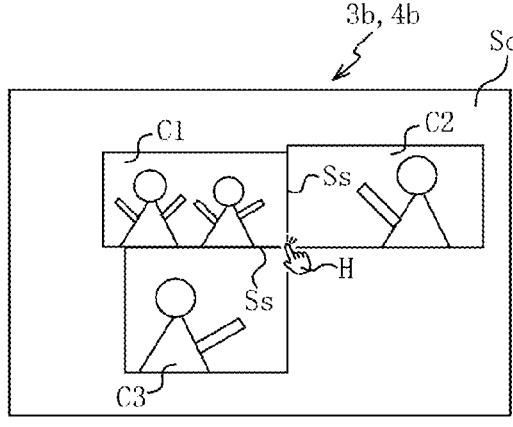
FIG. 3C

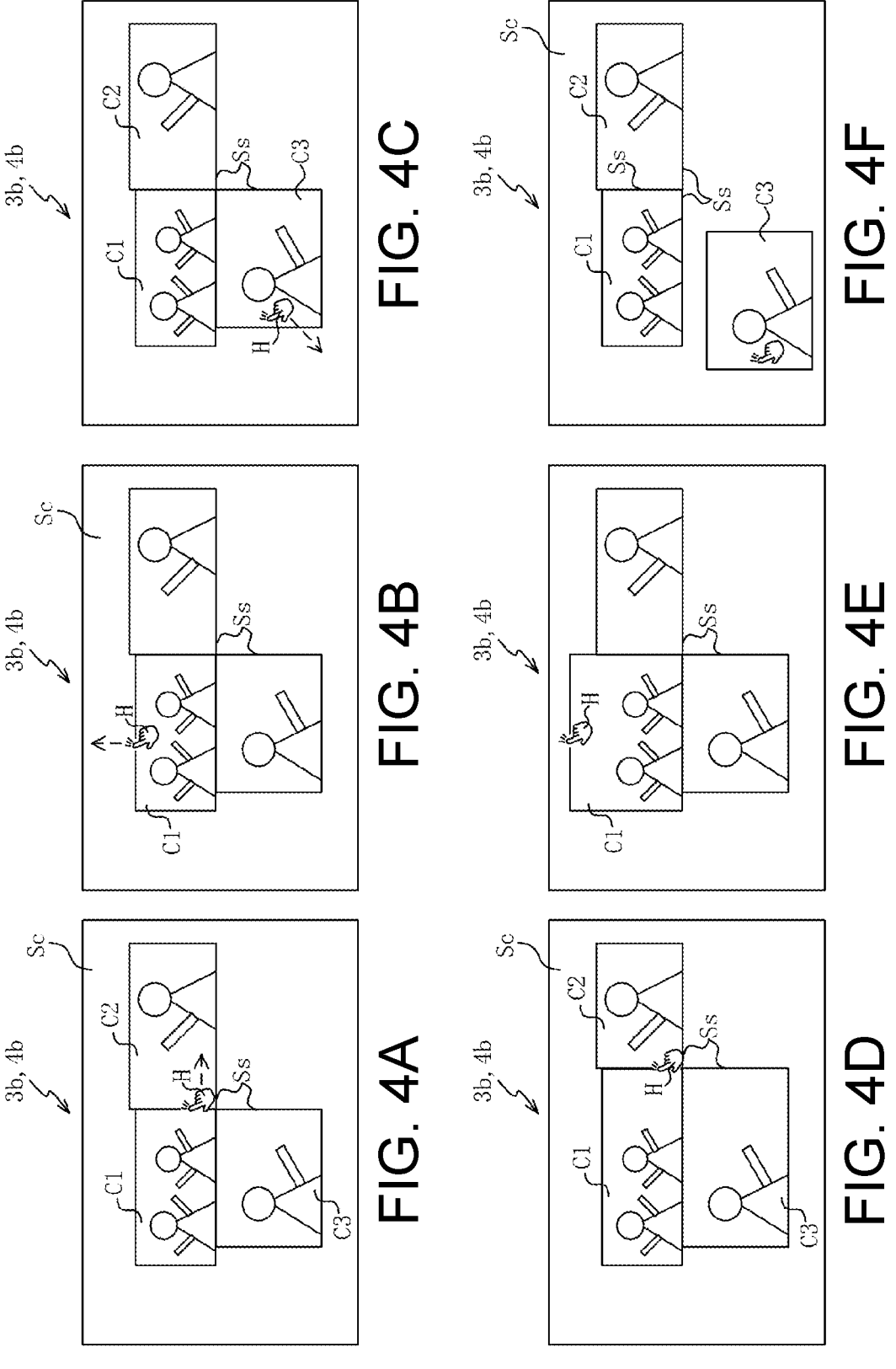

VIDEO PROCESSING APPARATUS, COMPUTER-READABLE RECORDING MEDIUM RECORDING VIDEO PROCESSING PROGRAM, AND VIDEO PROCESSING METHOD

CROSS-REFERENCE TO RELATED APPLICATION

This application claims the priority benefits of Japanese application no. 2023-026294, filed on Feb. 22, 2023. The entirety of the above-mentioned patent application is hereby incorporated by reference herein and made a part of this specification.

BACKGROUND

Technical Field

The disclosure relates to a video processing apparatus, a computer-readable recording medium recording a video processing program, and a video processing method.

Description of Related Art

Patent Document 1 (Japanese Patent Application Laid-Open No. 2002-262179 (for example, paragraphs 0016 to 0019 and FIG. 1 to FIG. 4)) discloses a video mixer that has multiple video input channels and outputs an output video in which input videos respectively input from the video input channels are arranged. The video mixer is configured to allow the user to arbitrarily set the size and position of each input video in the output video, making it possible to output an output video in which the input video having a size desired by the user is arranged at an arrangement position desired by the user.

However, when aligning the positions of multiple input videos, such as aligning the positions of horizontal sides of side-by-side input videos in the output video, with the video mixer of Patent Document 1, the user needs to be familiar with how to operate the video mixer and then operate the target input video one by one accordingly. This poses a problem that it takes time to create an output video.

The disclosure provides a video processing apparatus that is capable of easily aligning sides near a specified position among the sides of contents arranged in a composite video, a computer-readable recording medium that records a video processing program, and a video processing method.

SUMMARY

A video processing apparatus according to an embodiment of the disclosure includes a processor and is configured to process a plurality of contents including videos and output the contents as a composite video. The processor is configured to: capture information indicating a position specified on the composite video; search for a nearby range of the information indicating the position, and generate a plurality of sides; identify sides having the same or similar angles from the generated sides; and display the identified sides on the composite video.

A computer-readable recording medium records a video processing program according to an embodiment of the disclosure, which causes a computer to process a plurality of contents including videos and output the contents as a composite video. The video processing program causes the computer to: capture information indicating a position specified on the composite video; search for a nearby range of the information indicating the position, and generate a plurality of sides; identify sides having the same or similar angles from the generated sides; and display the identified sides on the composite video.

Further, a video processing method according to an embodiment of the disclosure includes: processing a plurality of contents including videos; outputting the contents as a composite video; capturing information indicating a position specified on the composite video; capturing information indicating a position specified on the composite video; searching for a nearby range of the information indicating the position, and generating a plurality of sides; identifying sides having the same or similar angles from the generated sides; and displaying the identified sides on the composite video.

BRIEF DESCRIPTION OF THE DRAWINGS

FIG. 3A is a diagram showing yet another composite video, FIG. 3B is a diagram showing a case where the user touches on the composite video in FIG. 3A, FIG. 3C is a diagram showing the composite video after alignment, FIG. 3D is a diagram showing the composite video before moving a specific side in the horizontal direction, and FIG. 3E is a diagram showing the composite video after moving the specific side.

FIG. 4A is a diagram showing a composite video before moving a specific side in the vertical direction, FIG. 4B is a diagram showing the composite video after moving the specific side, FIG. 4C is a diagram showing the composite video before moving sides other than the specific side, FIG. 4D is a diagram showing the composite video after moving sides other than the specific side, FIG. 4E is a diagram showing the composite video before releasing the specific side, and FIG. 4F is a diagram showing the composite video after releasing the specific side.

DESCRIPTION OF THE EMBODIMENTS

Figure 1:
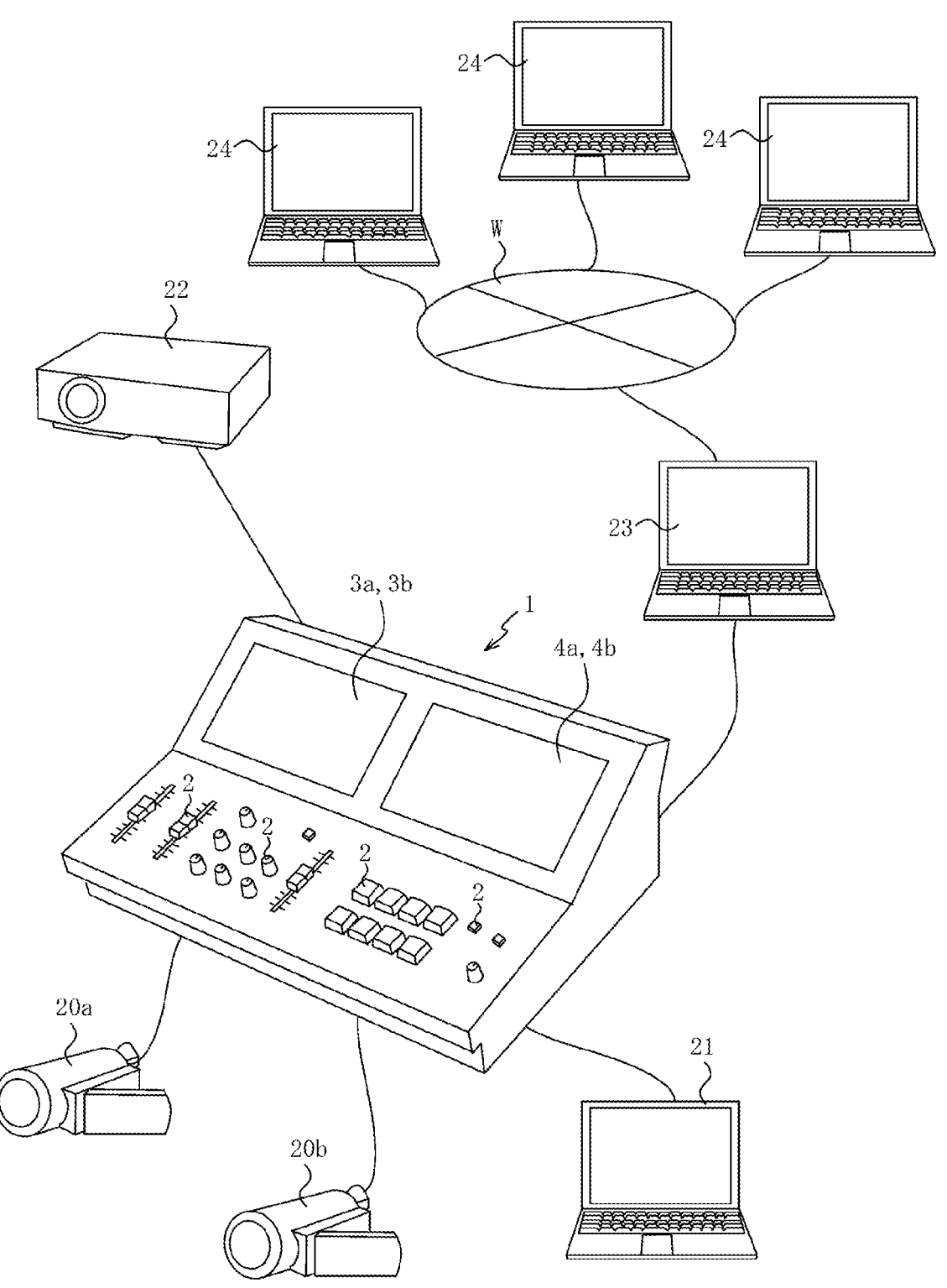
FIG. 1 is a diagram including an external view of a video switcher, which is an example of the video processing apparatus, and showing the peripheral systems thereof.

Exemplary embodiments will be described below with reference to the accompanying drawings. An overview of a video switcher 1 of this embodiment will be described using FIG. 1 with reference to FIG. 2A to FIG. 2F. FIG. 1 is a diagram including an external view of the video switcher 1, which is an example of a video processing apparatus, and showing the peripheral systems thereof. The video switcher 1 is an apparatus (video processing apparatus) that outputs a composite video Sc in which input images and videos are arranged into one video.

The video switcher 1 is connected with a video camera 20 to which images and videos to be arranged in the composite video Sc are input, a PC 21 for presentation (hereinafter abbreviated as "presentation PC 21"), a projector 22 from which the composite video Sc is output, and a PC 23 for distribution (hereinafter abbreviated as "distribution PC 23"). The video camera 20 (two are provided in this example) is a photographing device that inputs captured images or videos to the video switcher 1. The presentation PC 21 is an information processing device that inputs to the video switcher 1 images or videos created by a user H (simulating the position of the user H's finger) using installed application software.

The projector 22 is an output device that projects the composite video Sc from the video switcher 1 onto a large screen. The distribution PC 23 is an information processing device that distributes the composite video Sc output from the video switcher 1 via the Internet W. The composite video Sc distributed from the distribution PC 23 via the Internet W can be watched on a plurality of PCs 24 as distribution destinations (hereinafter abbreviated as "distribution destination PCs 24") connected to the Internet W. The video switcher 1 may be connected to the Internet W to directly distribute the composite video Sc from the video switcher 1 to the distribution destination PCs 24. In this case, the distribution PC 23 can be omitted.

In the video switcher 1, a "layer" is provided for each input source, that is, the video cameras 20a and 20b and the presentation PC 21, in which the images and videos input from the corresponding input source are arranged, and in each layer, the images and videos input from the corresponding input source are arranged in the size and position specified by the user H. The composite video Sc is created by overlapping such layers. Hereinafter, the images and videos arranged in the layer will be collectively referred to as "contents."

The video switcher 1 is provided with various setting buttons 2 for inputting instructions from the user H, a left touch panel 3a, a left LCD 3b, a right touch panel 4a, and a right LCD 4b. The left touch panel 3a is an input device for inputting a touched position signal in response to a touch operation of the user H. The left LCD 3b is a display device that displays the layout of the composite video Sc to be output. The left touch panel 3a and the left LCD 3b are respectively arranged on the left side of the front of the video switcher 1, and the left touch panel 3a is provided to overlap on the left LCD 3b.

Similarly, the right touch panel 4a is an input device for inputting a signal related to the touched position in response to a touch operation of the user H. The right LCD 4b is a display device that displays the layout of the composite video Sc to be output. The right touch panel 4a and the right LCD 4b are respectively arranged on the right side of the front of the video switcher 1, and the right touch panel 4a is provided to overlap on the right LCD 4b.

The video switcher 1 of this embodiment is configured to be capable of outputting different composite videos Sc to the projector 22 and the distribution PC 23, respectively. A screen for setting and editing the composite video Sc to be output to the projector 22 is displayed on the left LCD 3b, and a screen for setting and editing the composite video Sc to be output to the distribution PC 23 is displayed on the right LCD 4b.

The user H touches on the touch panels 3a and 3b arranged on the LCDs 3b and 4b while visually checking the layout of the composite video Sc displayed on each of the LCDs 3b and 4b, so as to freely specify and set the size and arrangement of contents in the composite video Sc and construct the composite video Sc with a desired layout.

In constructing such a composite video Sc, parallel sides of the contents arranged horizontally or vertically may be aligned to the same position. Conventionally, in order to align the sides of multiple contents arranged horizontally or vertically, it is necessary to select and move the target contents one by one to match the sides. As a result, it takes time to construct the composite video Sc with the sides of the contents aligned, and there is a great burden on the user H who performs such an operation.

Therefore, in this embodiment, the sides of the contents near a specified position, which is a position specified by the user H on the touch panels 3a and 3b, in the composite video Sc are identified, and the identified sides are aligned. A method for aligning the contents in the composite video Sc will be described in detail using FIG. 2A to FIG. 3E.

Figures 2A, 2B, 2C, 2D, 2E, 2F:
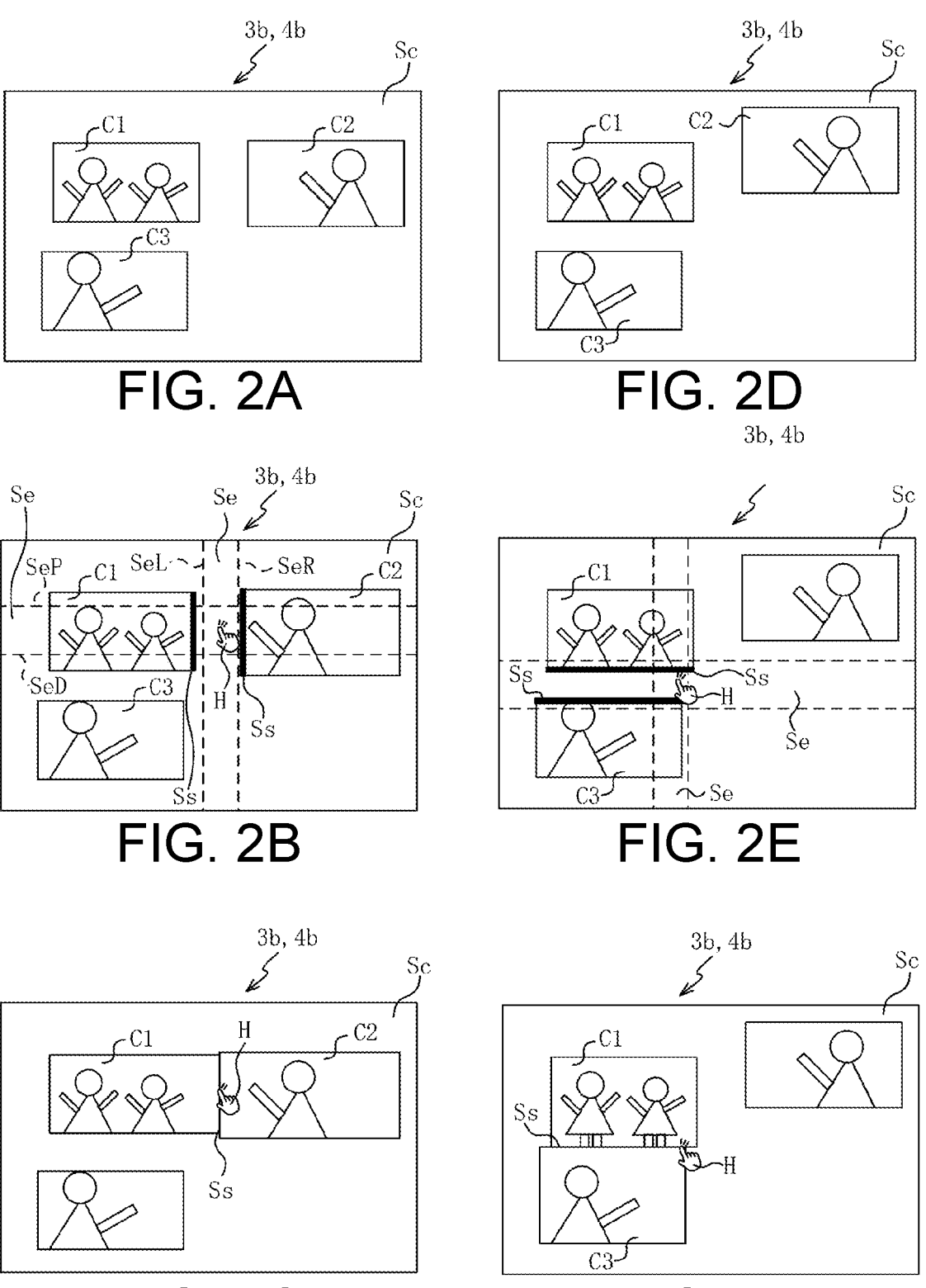
FIG. 2A is a diagram showing a composite video.
FIG. 2B is a diagram showing a case where the user touches on the composite video in FIG. 2A.
FIG. 2C is a diagram showing the composite video after alignment, FIG. 2D a diagram showing another composite video.
FIG. 2E is a diagram showing a case where the user touches on the composite video.
FIG. 2F is a diagram showing the composite video after alignment.

FIG. 2A is a diagram showing a composite video Sc, FIG. 2B is a diagram showing a case where the user H touches on the composite video Sc in FIG. 2A, and FIG. 2C is a diagram showing the composite video Sc after alignment.

Contents C1 to C3 input from the video camera 20 and the presentation PC 21 are arranged in the composite video Sc. The contents C1 to C3 arranged in the composite video Sc display the respectively input images or videos that are trimmed according to the size of the corresponding display area in the composite video Sc. As a result, the input images or videos are displayed in the composite video Sc without being distorted.

In FIG. 2A, when trying to align the respective sides of the content C1 and the content C2 in the vertical direction, that is, to move the parallel sides of the content C1 and the content C2 to the same position, the user H touches between the content C1 and the content C2 as shown in FIG. 2B. In FIG. 2A, the user H is performing a touch operation by touching the touch panels 3a and 4a with the index finger, for example, so the position (information) of the index finger is set as the "specified position" (information). In this embodiment, "parallel sides" refer to target sides in the vertical direction or the horizontal direction which have the same angle, but target sides having similar angles, for example, angles having a difference within ±3 degrees, may be included.

The video switcher 1 forms a search range Se which is an area for acquiring the sides of the contents C1 to C3 near the specified position when the specified position is acquired from the user H via the touch panels 3a and 4a. In this embodiment, the search range Se is formed in the vertical direction and the horizontal direction of the acquired specified position.

Specifically, first, a left boundary line SeL is formed between the upper end and the lower end of the composite video Sc at a position moved 50 pixels to the left from the acquired specified position in the composite video Sc, and a right boundary line SeR is formed between the upper end and the lower end of the composite video Sc at a position moved 50 pixels to the right from the acquired specified position. The area formed between the left boundary line SeL and the right boundary line SeR (that is, the area sandwiched between the left boundary line SeL and the right boundary line SeR) is set as the search range Se in the vertical direction.

Similarly, an upper boundary line SeP is formed between the left end and the right end of the composite video Sc at a position moved 50 pixels upward from the acquired specified position in the composite video Sc, and a lower boundary line SeD is formed between the left end and the right end of the composite video Sc at a position moved 50 pixels downward from the acquired specified position. The area formed between the upper boundary line SeP and the lower boundary line SeD (that is, the area sandwiched between the upper boundary line SeP and the lower boundary line SeD) is set as the search range Se in the horizontal direction.

It should be noted that the width of the search range Se in the vertical direction or the horizontal direction is not limited to 100 pixels horizontally or vertically, but may be 100 pixels or more or 100 pixels or less, and the width of the search range Se may be set in advance by the user H on the LCDs 3b and 4b using the setting buttons 2 or the like. The widths of the search range Se in the vertical direction and the search range Se in the horizontal direction are not necessarily the same, and the width of the search range Se in the vertical direction may be wider or narrower than the search range Se in the horizontal direction.

The sides of the contents C1 to C3 included in the cross-shaped search ranges Se in the vertical direction and the horizontal direction centered on the specified position touched by the user H are searched. In FIG. 2B, the search range Se in the horizontal direction includes the side of the content C1 (more specifically, the right side of the content C1 that is close to the specified position) and the side of the content C2 (more specifically, the left side of the content C2 close to the specified position). The left side of the content C1 and the right side of the content C2, which have the same or similar angles, are each identified as a specific side Ss which is a target side to be aligned.

The search range Se in the vertical direction includes the area from the upper end to the lower end of the composite video Sc, and the search range Se in the horizontal direction includes the area from the left end to the right end of the composite video Sc, which makes it possible to identify the sides of the contents C1 to C3 that are vertically and horizontally near the specified position as the specific side Ss without missing any.

On the other hand, as the width of the search range Se in the vertical direction or the horizontal direction is limited to 100 pixels, the sides of the contents C1 to C3 located far from the specified position can be prevented from being unnecessarily identified as the specific side Ss.

Then, the sides identified as the specific side Ss are aligned. Specifically, as shown in FIG. 2C, the right side of the content C1 identified as the specific side Ss is moved to the specified position, and the left side of the content C2 identified as the specific side Ss is also moved to the specified position. As a result, the right side of the content C1 and the left side of the content C2 are aligned. In addition, the alignment may be performed using the specified position as the reference, using the side of the content C1 as the reference, or using a point midway between the sides of the contents C1 and C2 as the reference, which are all feasible.

That is, the position to which the specific side Ss is aligned is the specified position of the composite video Sc specified by the user H via the touch panels 3a and 4a. Since the specific side Ss is aligned to the position touched by the user H, it is easy to predict the position of the specific side Ss in the composite video Sc after alignment, and the specific side Ss can be easily aligned to the position intended by the user H.

When the specific sides Ss of the contents C1 and C2 are aligned, as shown in FIG. 2C, the shapes of the display areas of the contents C1 and C2 in the composite video Sc are respectively deformed compared to the shapes before the alignment of the specific sides Ss (FIG. 2A and FIG. 2B). At this time, even if the display areas are deformed by the contents C1 and C2 after the specific sides Ss are aligned, processing is performed to keep the aspect ratios of these display contents the same as the aspect ratios before the alignment of the specific sides Ss.

Specifically, when the specific sides Ss are aligned, once again, the images or videos input from the input sources are trimmed according to the sizes of the display areas of the contents C1 and C2 of the composite video Sc after the alignment, and are respectively displayed in the display areas after the alignment. As a result, the contents C1 and C2 displayed after the specific sides Ss are aligned can be prevented from being distorted compared to the images or videos originally input from the input sources, which suppresses the discomfort felt by the viewer of the composite video Sc.

The method for maintaining the aspect ratio of the display contents of the contents C1 and C2 after the specific sides Ss are aligned is not limited to the above-described trimming method. For example, the contents C1 and C2 displayed before alignment may be enlarged or reduced by a magnification that corresponds to the ratio (enlargement ratio) between the sizes of the display areas of the contents C1 and C2 before alignment and the sizes of the display areas of the contents C1 and C2 after alignment, and displayed in the corresponding display areas after alignment, or other methods may also be used.

Although FIG. 2A to FIG. 2C illustrate a case of aligning the sides of the contents C1 and C2 in the vertical direction, this embodiment is also applicable to a case of aligning the sides in the horizontal direction, as shown in FIG. 2D to FIG. 2F. FIG. 2D is a diagram showing another composite video Sc, FIG. 2E is a diagram showing a case where the user touches on the composite video Sc in FIG. 2D, and FIG. 2F is a diagram showing the composite video Sc after alignment.

In FIG. 2E, when the user H touches between the content C1 and the content C3 displayed below the content C1, the formed search range Se includes the lower side of the content C1 and the upper side of the content C3. As a result, these sides in the horizontal direction are identified as specific sides Ss, and the identified specific sides Ss are aligned as shown in FIG. 2F.

Next, a case where the sides in the vertical direction and the sides in the horizontal direction are aligned at the same time will be described with reference to FIG. 3A to FIG. 3C. FIG. 3A is a diagram showing yet another composite video Sc, FIG. 3E is a diagram showing a case where the user H touches on the composite video Sc in FIG. 3D, and FIG. 3b3 is a diagram showing the composite video Sc after alignment.

As shown in FIG. 3E, when the user H touches above the content C3 between the content C1 and the content C2, the search range Se formed as a result includes the right and lower sides of the content C1, the left and lower sides of the content C2, and the right and upper sides of the content C3.

As a result, the specific sides Ss in the horizontal direction and the vertical direction are identified. Specifically, the lower side of the content C1, the lower side of the content C2, and the upper side of the content C3 are identified as the specific sides Ss in the horizontal direction. Furthermore, the right side of the content C1, the left side of the content C2, and the right side of the content C3 are identified as the specific sides Ss in the vertical direction. Then, as shown in FIG. 3b3, the identified specific sides Ss in the horizontal direction and the identified specific sides Ss in the vertical direction are aligned. In addition, the alignment may be performed using the specified position as the reference, using the side of the content C1 as the reference, or using a point midway between the sides of the contents C1, C2, and C3 as the reference, which are all feasible.

In this way, in the video switcher 1, the specified position specified in the composite video Sc by the user H via the touch panels 3a and 4a is acquired, the search range Se is formed based on the acquired specified position. The sides of the contents C1 to C3 included in the search range Se are identified as specific sides Ss, and the identified specific sides Ss are aligned. Thus, the user H is allowed to easily align the sides near the specified position, among the sides of the contents C1 to C3 arranged in the composite video Sc, by simply specifying the specified position in the composite video Sc.

Next, the movement of the specific side Ss will be described with reference to FIG. 3D, FIG. 3E, FIG. 4A, and FIG. 4B. FIG. 3D is a diagram showing the composite video Sc before moving the specific side Ss in the horizontal direction, FIG. 3E is a diagram showing the composite video Sc after moving the specific side Ss, FIG. 4A is a diagram showing the composite video Sc before moving the specific side Ss in the vertical direction, and FIG. 4B is a diagram showing the composite video Sc after moving the specific side Ss.

First, the movement of the specific side Ss in the horizontal direction will be described. In FIG. 3D, the lower sides of the contents C1 and C2 and the upper side of the content C3 are identified as specific sides Ss in the horizontal direction. In this state, when the user H drags the specific sides Ss in the horizontal direction downward, as shown in FIG. 3E, the lower sides of the contents C1 and C2 and the upper side of the content C3 identified as the specific sides Ss are moved downward while maintaining the horizontally aligned state.

Next, the movement of the specific side Ss in the vertical direction will be described. In FIG. 4A, the right sides of the contents C1 and C3 and the left side of the content C2 are identified as specific sides Ss in the vertical direction. In this state, when the user H drags the specific sides Ss in the vertical direction to the right, as shown in FIG. 4B, the right sides of the contents C1 and C3 and the left side of the content C2 identified as the specific sides Ss are moved downward while maintaining the vertically aligned state.

In this way, the aligned specific sides Ss can be moved while maintaining the aligned state by simply dragging the identified specific sides Ss in the horizontal direction or the vertical direction, so the operability of the user H when moving the specific sides Ss can be improved.

Next, the movement of sides other than the specific sides Ss of the contents C1 to C3 will be described. FIG. 4C is a diagram showing the composite video Sc before moving sides other than the specific side Ss, and FIG. 4D is a diagram showing the composite video Sc after moving sides other than the specific side Ss. As shown in FIG. 4C and FIG. 4D, when the user H specifies the upper side of the content C1 that is not identified as the specific side Ss and drags the upper side upward, only the upper side of the content C1 is moved upward while the aligned state of the specific sides Ss is maintained.

As a result, the user H can freely move the sides other than the specific sides Ss of the contents C1 to C3 while maintaining the aligned state of the specific sides Ss, making it possible to enlarge or reduce the areas of the contents C1 to C3 in the shape that is most suitable for the situation at the time and display the contents C1 to C3 in the composite video Sc.

Next, a method for releasing the specific sides Ss from the aligned state will be described in detail with reference to FIG. 4E and FIG. 4F. FIG. 4E is a diagram showing the composite video Sc before releasing the specific side Ss, and FIG. 4F is a diagram showing the composite video Sc after releasing the specific side Ss. In this embodiment, the release of specific sides Ss for the contents C1 to C3 having sides identified as the specific sides Ss is performed by dragging the display areas of the target contents C1 to C3.

Specifically, in FIG. 4E, the lower sides of the contents C1 and C2 and the upper side of the content C3 are identified as the specific sides Ss in the horizontal direction, and the left sides of the contents C1 and C3 and the right side of the content C2 are identified as the specific sides Ss in the vertical direction. In this state, the user H identifies the display area of the content C3, specifically, the area inside the boundary between the content C3 and other areas, and drags the display area diagonally downward to the left.

As a result, the sides of the content C3 are deleted from the specific sides Ss in the horizontal direction and the vertical direction, and all the sides of the content C3 are released from the specific sides Ss. At the same time, only the content C3 is moved diagonally downward to the left in response to the drag operation of the user H. That is, among the contents C1 to C3 with the specific sides Ss identified, the sides of the content C3 are released from the specific sides Ss by the user H's intention to move only the content C3 independently, that is, to drag only the display area of the content C3. Thereby, the user H can intuitively release the specific side Ss.

Figure 5:
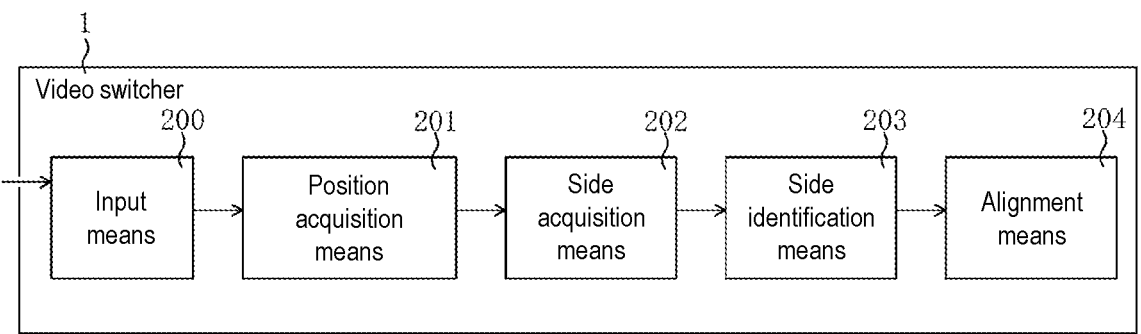
FIG. 5 is a functional block diagram of the video switcher.

Next, the main functions of the video switcher 1 will be described with reference to FIG. 5. FIG. 5 is a functional block diagram of the video switcher 1. As shown in FIG. 5, the video switcher 1 includes a position acquisition means 201, a side acquisition means 202, a side identification means 203, and an alignment means 204.

Figure 6:
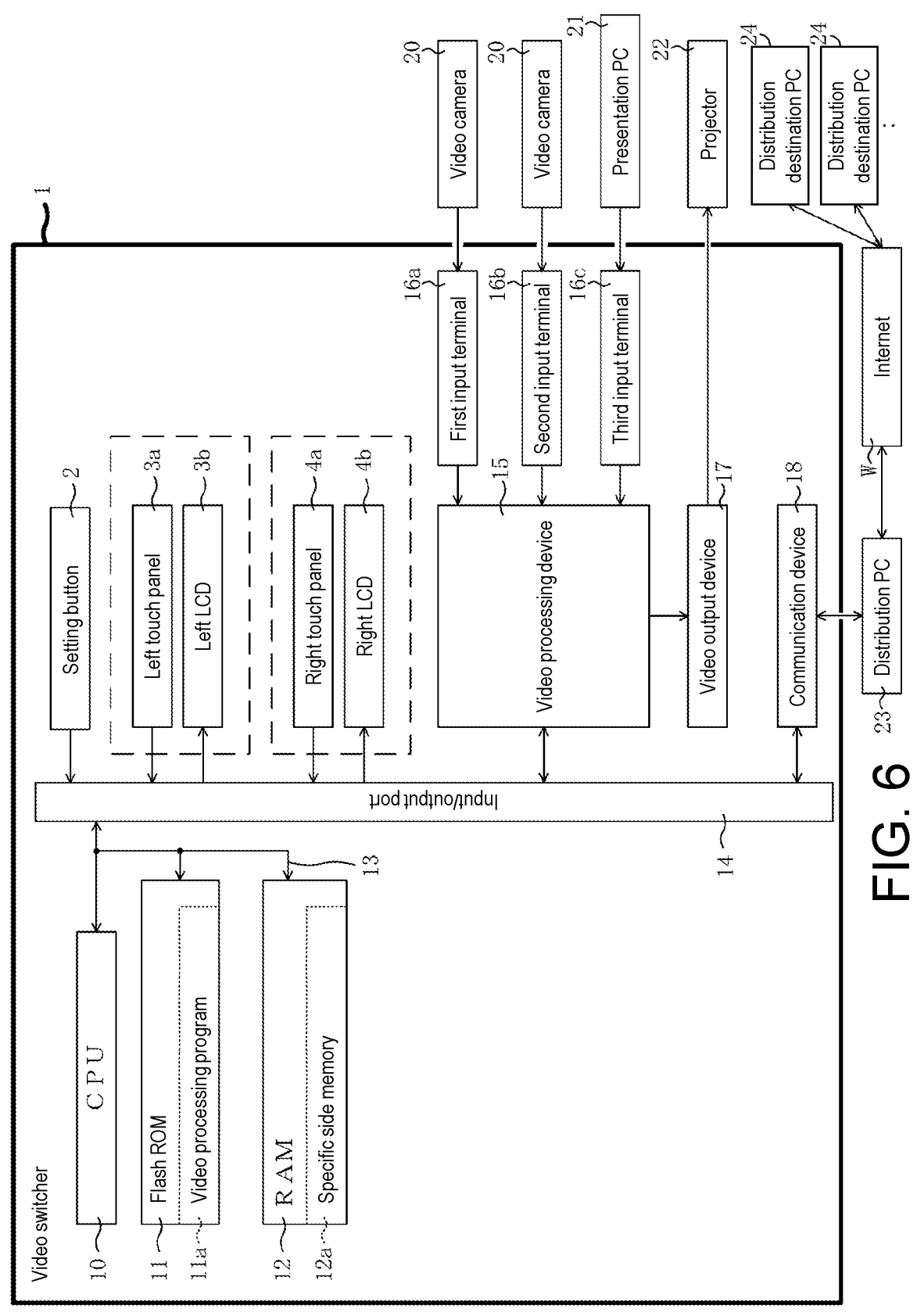
FIG. 6 is a block diagram showing the signal processing configuration of the video switcher.

The position acquisition means 201 is means for acquiring the specified position, which is a position specified in the composite video Sc, from an input means 200, and is realized by a CPU 10, which will be described later in FIG. 6. The input means 200 is realized by the above-described touch panels 3a and 4a. The side acquisition means 202 is a means for acquiring the sides of the contents included in the search range formed near the specified position acquired by the position acquisition means 201 in the composite video Sc, and is realized by the CPU 10.

The side identification means 203 is a means for identifying a plurality of sides having the same or similar angles among the sides acquired by the side acquisition means 202 as specific sides Ss, and is realized by the CPU 10. The alignment means 204 is a means for aligning or releasing the specific sides Ss identified by the side identification means 203 in the contents arranged in the composite video Sc, and is realized by the CPU 10.

In the video switcher 1, the specified position is acquired in the composite video Sc, and the sides of the contents included in the search range formed near the acquired specified position are acquired. Among the acquired sides, sides having the same or similar angles are identified as the specific sides Ss, and the identified specific sides Ss of the contents arranged in the composite video Sc are aligned. As a result, the user H is allowed to easily align the sides near the specified position, among the sides of the contents arranged in the composite video Sc, by simply specifying the specified position in the composite video Sc.

Next, the signal processing of the video switcher 1, which is an example of the video processing apparatus, will be described with reference to FIG. 6. FIG. 6 is a block diagram showing the signal processing configuration of the video switcher 1. As shown in FIG. 6, the video switcher 1 includes the CPU 10, a flash ROM 11, and a RAM 12, which are respectively connected to an input/output port 14 via a bus line 13. The input/output port 14 is further connected with the above-described various setting buttons 2, the left touch panel 3*a*, the left LCD 3*b*, the right touch panel 4*a*, the right LCD 4*b*, a video processing device 15, and a communication device 18.

Figure 7:
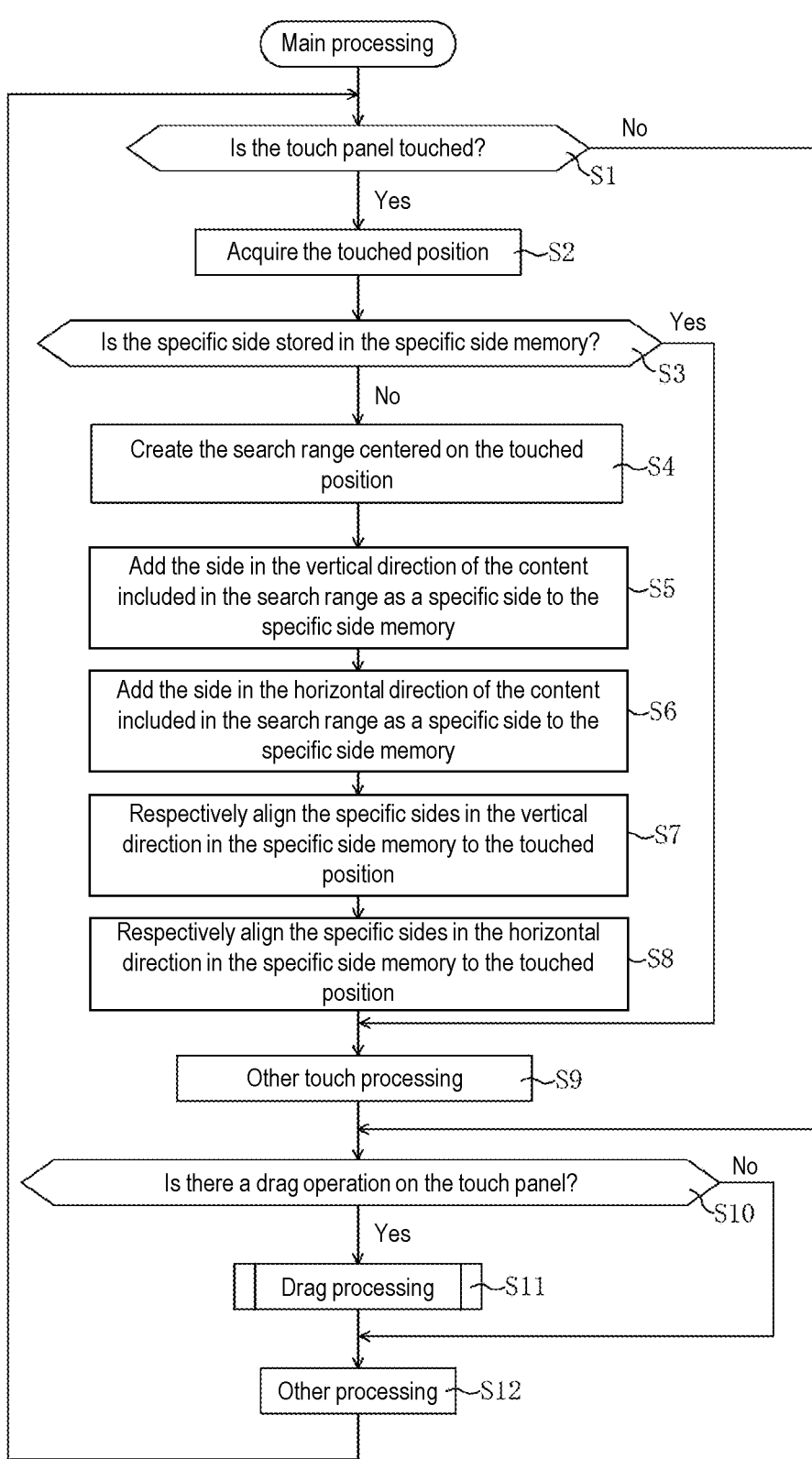
FIG. 7 is a flowchart of the main processing.

The CPU 10 is an arithmetic device that controls each part connected by the bus line 13. The flash ROM 11 is a rewritable non-volatile storage device that stores programs to be executed by the CPU 10, fixed value data, etc., and stores a video processing program 11*a*. When the video processing program 11*a* is executed by the CPU 10, the main processing in FIG. 7 is executed. The RAM 12 is a memory for rewritably storing various work data, flags, etc. when the CPU 10 executes the programs, and is provided with a specific side memory 12*a* for storing the specific side Ss.

The video processing device 15 is an arithmetic device that performs image processing in accordance with instructions from the CPU 10. The video processing device 15 is connected with a first input terminal 16*a* to a third input terminal 16*c* that input images and videos to be subjected to image processing in the video processing device 15, and a video output device 17 that outputs images and videos such as the composite video Sc subjected to image processing in the video processing device 15.

The video camera 20 and the presentation PC 21 described above are connected to the first input terminal 16*a* to the third input terminal 16*c*, and the images and videos from these are input to the video processing device 15 via the first input terminal 16*a* to the third input terminal 16*c*. Further, the projector 22 is connected to the video output device 17, and the corresponding videos are output to the projector 22 via the video output device 17. It should be noted that at least a part of the video processing device 15 and the video output device 17 may be configured with an electronic circuit such as an FPGA (field-programmable gate array) or a dedicated LSI.

The communication device 18 is a device for communicating with an external device, and is particularly communicably connected to the distribution PC 23 described above. The distribution PC 23 is connected to the Internet W, and the above-described distribution destination PCs 24 are connected to the Internet W.

Next, the processing executed by the CPU 10 of the video switcher 1, which is an example of the video processing apparatus, will be described with reference to FIG. 7 and FIG. 8. FIG. 7 is a flowchart of the main processing. The main processing is processing executed when the video switcher 1 is powered on.

In the main processing, first, whether the touch panels 3*a* and 4*a* are touched is confirmed (S1). In the process of S1, when the touch panels 3*a* and 4*a* are touched (S1: Yes), the touched position, that is, the specified position, is acquired (S2). After the process of S2, whether the specific side Ss is stored in the specific side memory 12*a* is confirmed (S3).

In the process of S3, when the specific side Ss is not stored in the specific side memory 12*a* (S3: No), the search range Se described with reference to FIG. 2B, etc. is created to be centered on the specified position acquired in the process of S2 (S4). After the process of S4, the sides of the contents in the vertical direction included in the search range Se are added to the specific side memory 12*a* as specific sides Ss in the vertical direction (S5). Further, after the process of S5, the sides of the contents in the horizontal direction included in the search range Se are added to the specific side memory 12*a* as specific sides Ss in the horizontal direction (S6).

After the process of S6, the specific sides Ss in the vertical direction stored in the specific side memory 12*a* are aligned to the specified position acquired in the process of S2, as described in FIG. 2B and FIG. 2C (S7). After the process of S7, the specific sides Ss in the horizontal direction stored in the specific side memory 12*a* are aligned to the specified position acquired in the process of S2, as described in FIG. 2E and FIG. 2F (S8). As a result, the specific sides Ss in the vertical direction and the specific sides Ss in the horizontal direction are aligned respectively.

In the process of S3, when the specific side Ss is stored in the specific side memory 12*a* (S3: Yes), the processes of S4 to S8 are skipped. After the processes of S3 and S8, other processing when the touch panels 3*a* and 4*a* are touched is performed (S9).

In the process of S1, when the touch panels 3*a* and 4*a* are not touched (S1: No), the processes of S2 to S9 are skipped. After the processes of S1 and S9, whether there is a drag operation on the touch panels 3*a* and 4*a* is confirmed (S10). In the process of S10, when there is a drag operation on the touch panels 3*a* and 4*a* (S10: Yes), the drag processing of S11 is executed. Here, the drag processing will be described with reference to FIG. 8.

Figure 8:
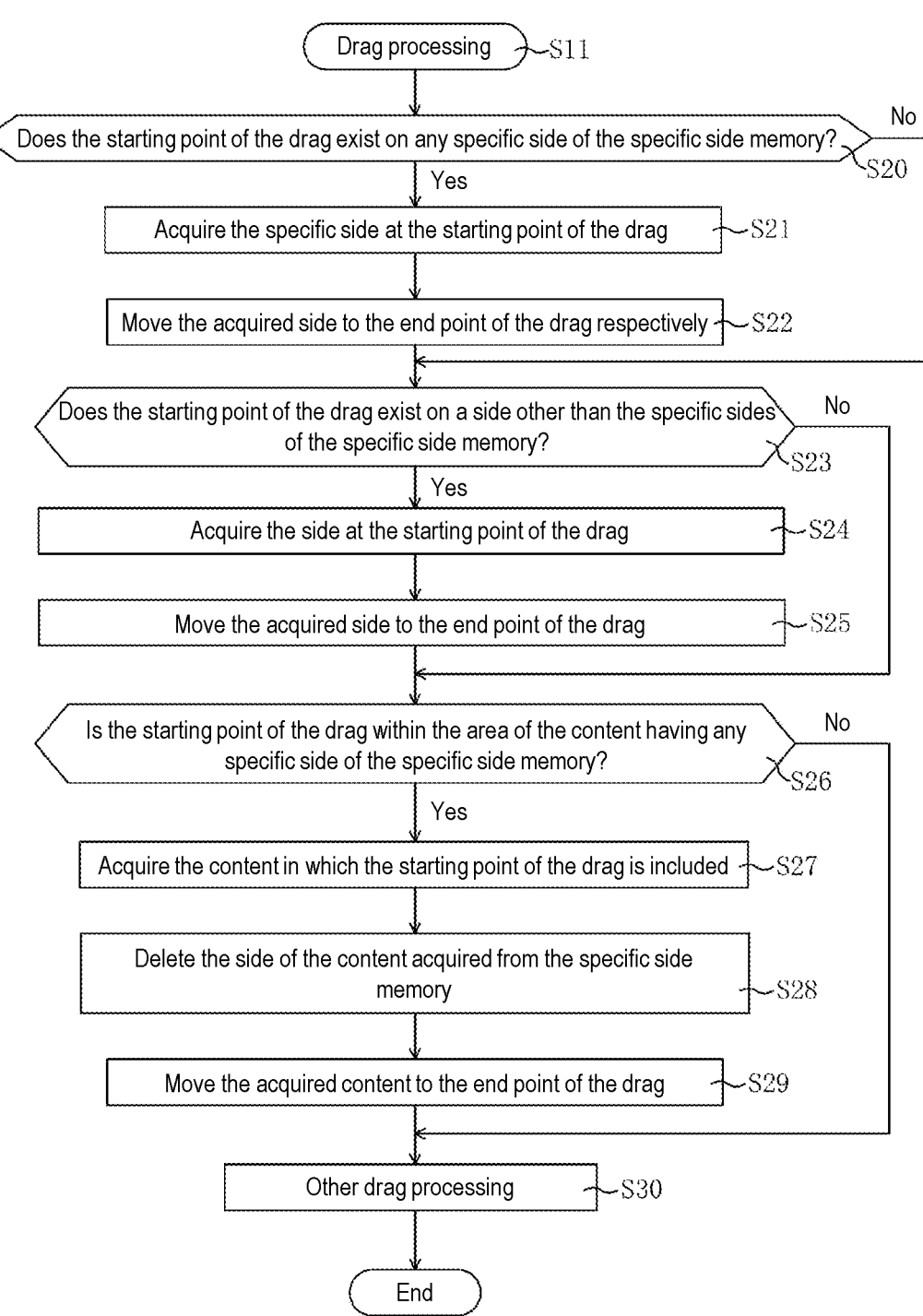
FIG. 8 is a flowchart of the drag processing.

FIG. 8 is a flowchart of the drag processing. In the drag processing, first, whether the starting point of the drag operation exists on any of the specific sides Ss stored in the specific side memory 12*a* is confirmed (S20). In the process of S20, when the starting point of the drag operation exists on any of the specific sides Ss stored in the specific side memory 12*a* (S20: Yes), it is a case where the specified specific sides Ss are moved all at once, as described in FIG. 3E. In such a case, first, the specific side Ss at the starting point of the drag operation is acquired from among the specific sides Ss stored in the specific side memory 12*a* (S21). After the process of S21, the acquired specific side Ss is respectively moved to the end point of the drag operation, as shown in FIG. 3E (S22).

On the other hand, in the process of S20, when the starting point of the drag operation does not exist on any of the specific sides Ss stored in the specific side memory 12*a* (S20: No), the processes of S21 and S22 are skipped. After the processes of S20 and S22, whether the starting point of the drag operation exists on a side of the content other than the specific sides Ss stored in the specific side memory 12*a* is confirmed (S23).

In the process of S23, when the starting point of the drag operation exists on a side of the content other than the specific sides Ss stored in the specific side memory 12*a* (S23: Yes), it is a case where only the side that is not identified as the specific side Ss is moved. In such a case, first, the side at the starting point of the drag operation is acquired (S24), and the acquired side is moved to the end point of the drag operation (S25).

On the other hand, in the process of S23, when the starting point of the drag operation does not exist on any side of the content other than the specific sides Ss stored in the specific side memory 12a (S23: No), the processes of S24 and S25 are skipped. After the processes of S23 and S25, whether the starting point of the drag operation exists within the area of the content having the specific side Ss stored in the specific side memory 12a is confirmed (S26).

In the process of S26, when the starting point of the drag operation exists within the display area of the content having the specific side Ss stored in the specific side memory 12a (S26: Yes), it is a case where the side of the target content is released from the specific side Ss, and the target content is moved, as described with reference to FIG. 4F. In such a case, the content in which the starting point of the drag operation is included in the display area is acquired first (S27). After the process of S27, the side of the content acquired in the process of S26 is deleted (released) from the specific side of the specific side memory 12a (S28), and the display area of the content is moved to the end point of the drag operation (S29).

On the other hand, in the process of S26, when the starting point of the drag operation does not exist within the display area of the content having the specific side Ss stored in the specific side memory 12a (S26: No), the processes of S27 to S29 are skipped. After the processes of S26 and S29, the other processing when there is a drag operation on the touch panels 3a and 4a is performed (S30), and the drag processing is ended.

Returning to FIG. 7, in the process of S10, when there is no drag operation on the touch panels 3a and 4a (S10: No), the drag processing of S11 is skipped. After the processes of S10 and S11, the other processing of the video switcher 1 is executed (S12), and the processing from S1 onwards is repeated.

Although the disclosure has been described based on the above embodiment, it can be easily inferred that various improvements and changes are possible.

In the above embodiment, images and videos (moving images, still images, etc.) are input to the video switcher 1 using the video camera 20 and the presentation PC 21, but the disclosure is not limited thereto. For example, images and videos may be input from other devices such as a hard disk recorder or a game machine. Furthermore, images and videos may be input from the Internet W or the like via the communication device 18. Alternatively, images and videos stored in advance in the flash ROM 11 of the video switcher 1 may be used. Images and videos input from the outside in this manner may be stored in the flash ROM 11 of the video switcher 1.

Furthermore, in the above embodiment, there are three types of input sources for inputting images and videos to the video switcher 1, which are the video cameras 20a and 20b and the presentation PC 21, but the disclosure is not limited thereto. The number of types of input sources may be three or less or three or more. For example, images and videos may be input from two video cameras 20a and 20b, one presentation PC 21, one game machine, and the Internet W.

In addition, the output destination for outputting the composite video Sc from the video switcher 1 is not limited to the projector 22 or the distribution PC 23. For example, the composite video Sc may be output to other devices such as a television connected to the first input terminal 16a (see FIG. 7) of the video switcher 1 or a smartphone connected via the Internet W.

Furthermore, in the above embodiment, there are two types of output destinations for outputting the composite video Sc from the video switcher 1, which are the projector 22 and the distribution PC 23, but the disclosure is not limited thereto. The number of types of output destinations may be two or less or two or more. For example, the composite video Sc may be output to two projectors 22, one television, and the distribution PC 23.

In the above embodiment, the network to which the distribution PC 23 and the distribution destination PCs 24 are connected is the Internet W, but the disclosure is not limited thereto. For example, the network may be an intranet to which the distribution destination PCs 24 connected are limited, or may be any other network constructed by any other communication system.

In the above embodiment, the video switcher 1 is provided with two combinations of touch panels and LCDs, which are the left touch panel 3a and the left LCD 3b, and the right touch panel 4a and the right LCD 4b, but the disclosure is not limited thereto. The number of combinations of touch panels and LCDs provided in the video switcher 1 may be one, three or more. Alternatively, the video switcher 1 is provided with one combination of a touch panel and an LCD, and the area of that one combination of a touch panel and an LCD is divided into two or more areas. The settings for the composite video Sc may be performed by specifying the setting mode and output destination for each divided area.

In the above embodiment, both the search ranges Se in the vertical direction and the horizontal direction are used as the search ranges Se, but the disclosure is not limited thereto. For example, as shown in FIG. 9A, the search range Se may be limited to the search range Se in the horizontal direction, or as shown in FIG. 9B, the search range Se may be limited to the search range Se in the vertical direction.

Further, the search range Se is defined as an area from the upper end to the lower end or from the left end to the right end of the composite video Sc, but the disclosure is not limited thereto. For example, as shown in FIG. 9C, the search range Se may be a rectangular area of a predetermined size (for example, horizontal direction: 100 pixels, vertical direction: 80 pixels) vertically and horizontally centered on the specified position.

Figures 9A, 9B, 9C, 9D:
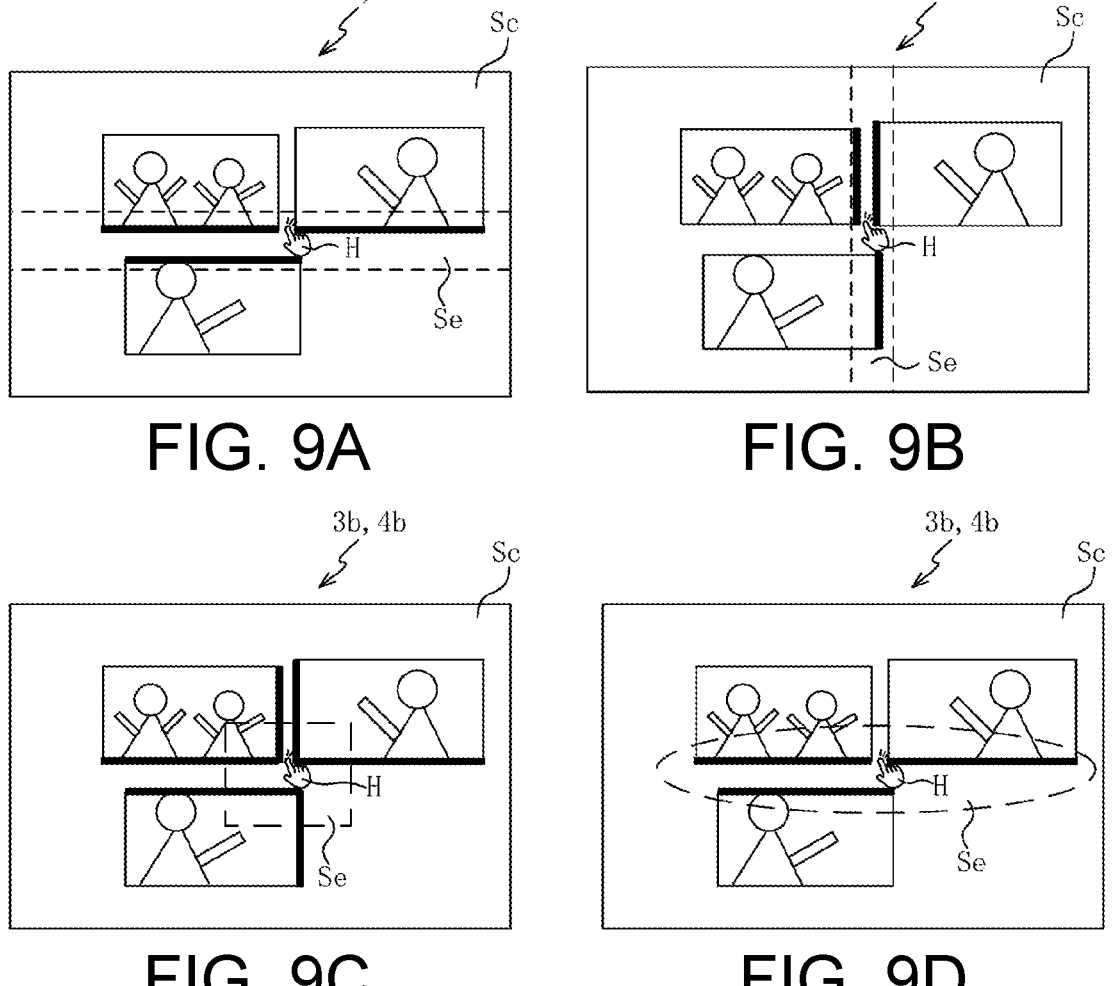
FIG. 9A to FIG. 9D are diagrams each showing the search range in a modified example.

Furthermore, the search range Se is not limited to a rectangular area as described above, and may be, for example, an elliptical area centered on the specified position, as shown in FIG. 9D, or areas of other shapes such as a circle or a polygon.

In the above embodiment, both the sides in the vertical direction and the sizes in the horizontal direction of the contents included in the search range Se are identified as the specific sides Ss, but the disclosure is not limited thereto. For example, only the sides in the vertical direction of the contents included in the search range Se may be identified as the specific sides Ss, or only the sides in the horizontal direction of the contents included in the search range Se may be identified as the specific sides Ss.

In these cases, only the sides in the horizontal direction may be identified as the specific sides Ss in the horizontal search range Se as shown in FIG. 9A, and only the sides in the vertical direction may be identified as the specific sides Ss in the vertical search range Se as shown in FIG. 9B. In addition, whether to identify the sides in the vertical direction or the sides in the horizontal direction of the content as the specific sides Ss may be selected using the various setting buttons 2 for inputting instructions from the user H, and the search range Se may be defined and set by a touch operation of the user H using the left touch panel 3a or the right touch panel 4a.

In the above embodiment, the specific sides Ss are aligned to the specified position as shown in FIG. 2C, but the disclosure is not limited thereto, and the specific sides Ss may be aligned to any position. For example, when the left side of the content C1 and the right side of the content C2 are set as the specific sides Ss as shown in FIG. 2C, the left side of the content C1 may be moved to the position of the right side of the content C2, or conversely, the right side of the content C2 may be moved to the position of the left side of the content C1.

In the above embodiment, the contents C1 to C3 are released from the specific sides Ss by dragging the display areas of the contents C1 to C3 as shown in FIG. 4F, but the disclosure is not limited thereto. For example, the contents C1 to C3 may be released from the specific sides Ss by an operation other than dragging, such as touching the display areas of the contents C1 to C3 twice (double tap) in succession.

In the above embodiment, the video switcher 1 is illustrated as an example of the apparatus for executing the video processing program 11a, but the disclosure is not limited thereto. For example, the video processing program 11a may be executed on an information processing apparatus such as a PC, a smartphone, or a tablet terminal. An example of the technical meaning of the matters described in the above embodiment is as follows. The video switcher 1 is an example of the video processing apparatus. The left touch panel 3a and the right touch panel 4a are examples of the input means. In the above embodiment, step S2 is an example of the position acquisition means (position acquisition step). Steps S5 and S6 are examples of the side acquisition means and the side identification means (side acquisition step and side identification step). Steps S7 and S8 are examples of the alignment means (alignment step). Step S25 is an example of the specific side moving means. Step S28 is an example of the specific side releasing means. Step S29 is an example of the content moving means.

What is claimed is:

1. A video processing apparatus, comprising a processor and configured to process a plurality of contents including videos and output the contents as a composite video, wherein the processor is configured to:
   capture information indicating a position specified by a user on the composite video;
   search for a nearby range of the information indicating the position, and generate a plurality of sides;
   identify sides having the same or similar angles from the generated sides; and
   display the identified sides on the composite video.

2. The video processing apparatus according to claim 1, wherein the sides identified by the processor are aligned and displayed based on the information indicating the position obtained by the processor.

3. The video processing apparatus according to claim 1, wherein an aspect ratio of the contents after being displayed by the processor is processed in a manner that an aspect ratio of the contents before display is maintained.

4. The video processing apparatus according to claim 1, wherein the range is an area of a predetermined width centered on the specified position in an up-down direction, and an area from a left end to a right end of the composite video in a left-right direction.

5. The video processing apparatus according to claim 4, wherein the range is an area of a predetermined width centered on the specified position in the left-right direction, and an area from an upper end to a lower end of the composite video in the up-down direction.

6. The video processing apparatus according to claim 1, wherein the processor is configured to:
   capture a position of the identified side after movement, which is specified using an input device, and move the identified side in a state of displaying the identified side on the composite video.

7. The video processing apparatus according to claim 1, comprising an input device, wherein the processor is configured to:
   acquire an instruction to move a content having a specific side, release the specific side of the content corresponding to the instruction acquired by the processor from being the specific side, and move the content corresponding to the instruction acquired by the processor.

8. The video processing apparatus according to claim 7, wherein the input device comprises a touch panel.

9. A non-transitory computer-readable recording medium, recording a video processing program that causes a computer to process a plurality of contents including videos and output the contents as a composite video, wherein the video processing program causes the computer to:
   capture information indicating a position specified by a user on the composite video;
   search for a nearby range of the information indicating the position, and generate a plurality of sides;
   identify sides having the same or similar angles from the generated sides; and
   display the identified sides on the composite video.

10. The non-transitory computer-readable recording medium recording the video processing program according to claim 9, wherein the identified sides are aligned and displayed based on the information indicating the specified position.

11. The non-transitory computer-readable recording medium recording the video processing program according to claim 9, wherein an aspect ratio of the contents after being displayed is processed in a manner that an aspect ratio of the contents before display is maintained.

12. The non-transitory computer-readable recording medium recording the video processing program according to claim 9, wherein the range is an area of a predetermined width centered on the specified position in an up-down direction, and an area from a left end to a right end of the composite video in a left-right direction.

13. The non-transitory computer-readable recording medium recording the video processing program according to claim 12, wherein the range is an area of a predetermined width centered on the specified position in a left-right direction, and an area from an upper end to a lower end of the composite video in an up-down direction.

14. A video processing method, comprising:
   processing a plurality of contents including videos;
   outputting the contents as a composite video;
   capturing information indicating a position specified by a user on the composite video;
   searching for a nearby range of the information indicating the position, and generating a plurality of sides;
   identifying sides having the same or similar angles from the generated sides; and
   displaying the identified sides on the composite video.

15. The video processing method according to claim 14, wherein the identified sides are aligned and displayed based on the information indicating the specified position.

16. The video processing method according to claim 14, wherein an aspect ratio of the contents after being displayed is processed in a manner that an aspect ratio of the contents before display is maintained.

17. The video processing method according to claim 14, wherein the range is an area of a predetermined width centered on the specified position in an up-down direction, and an area from a left end to a right end of the composite video in a left-right direction.

18. The video processing method according to claim 17, wherein the range is an area of a predetermined width centered on the specified position in a left-right direction, and an area from an upper end to a lower end of the composite video in an up-down direction.

* * * * *